Jan. 29, 1924.

J. D. McGREGOR

PRICE SCALE

Filed Aug. 14, 1922

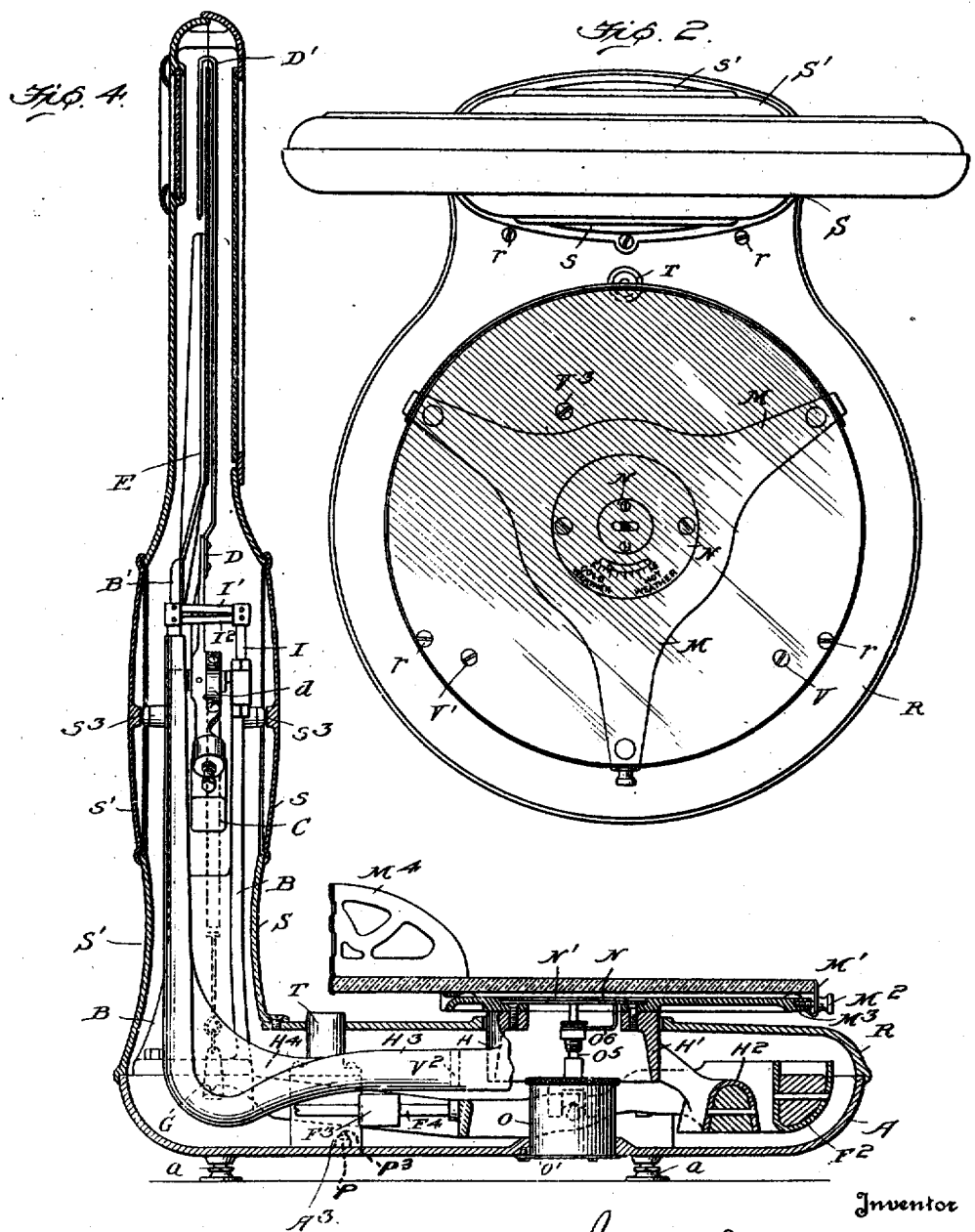

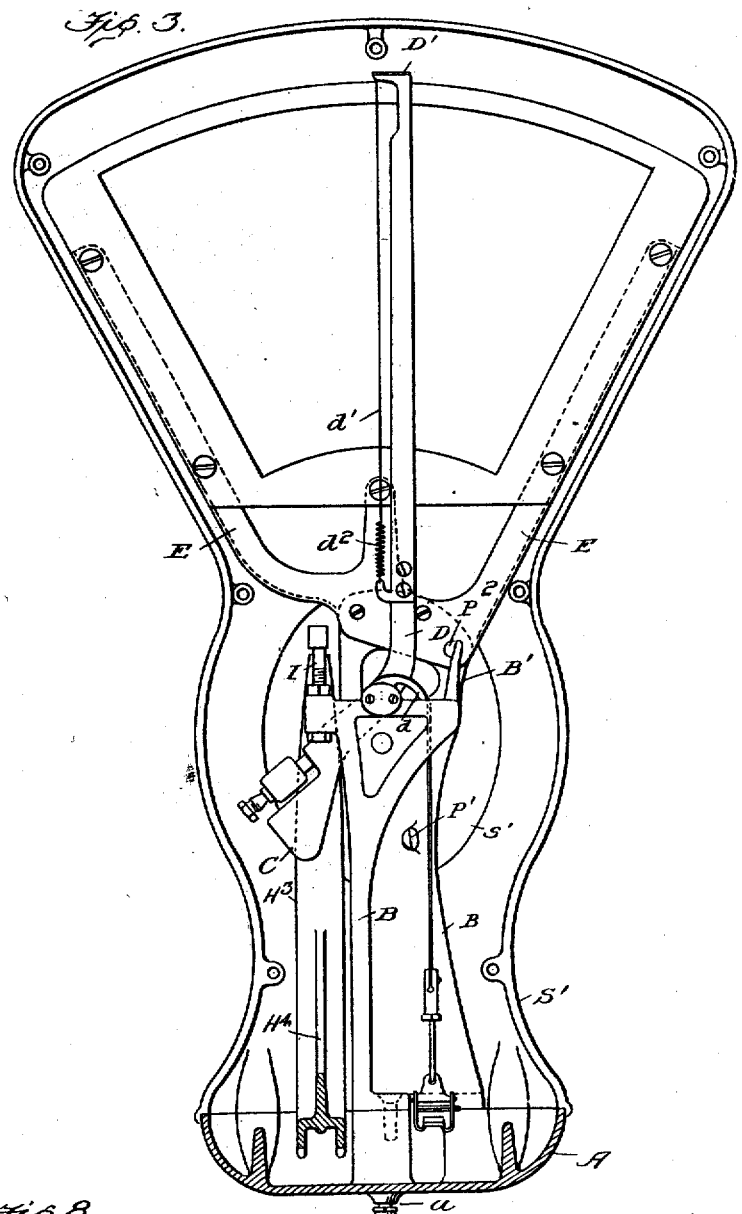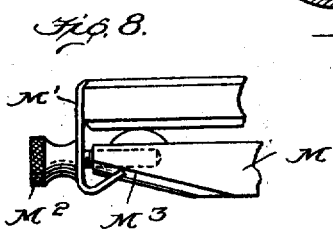

Jan. 29, 1924.
J. D. McGREGOR
1,481,920
PRICE SCALE
Filed Aug. 14, 1922
5 Sheets-Sheet 4
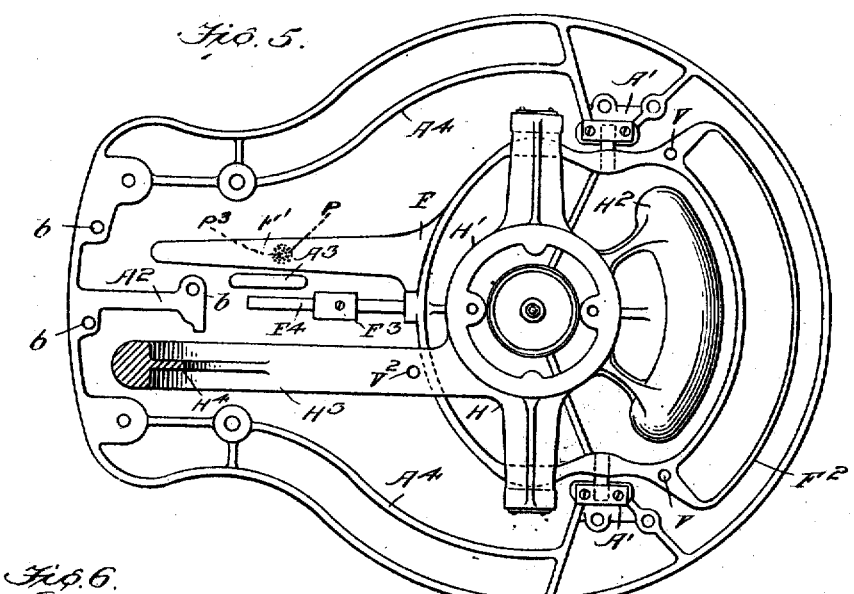
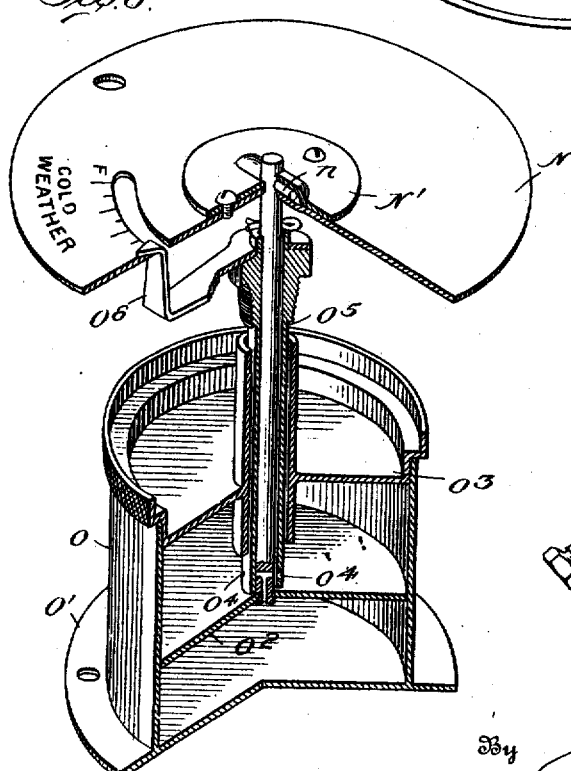
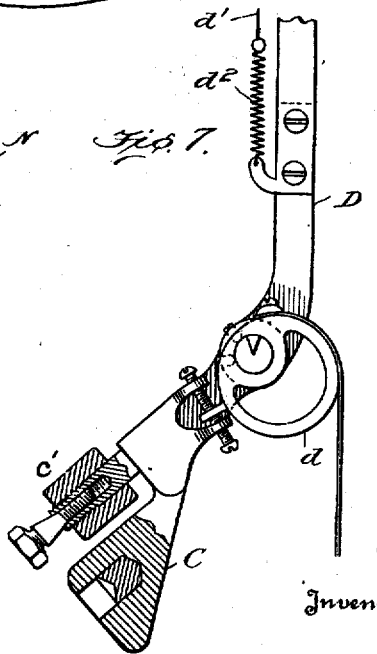
Inventor
James D. McGregor
By
his Attorneys Jan. 29, 1924.

J. D. McGREGOR

PRICE SCALE

Filed Aug. 14, 1922

Inventor
James D. McGregor
By Church Church
His Attorneys

Patented Jan. 29, 1924.

1,481,920

UNITED STATES PATENT OFFICE.

JAMES D. McGREGOR, OF BRANTFORD, ONTARIO, CANADA, ASSIGNOR TO BRANTFORD COMPUTING SCALES, LTD., OF BRANTFORD, CANADA, A CORPORATION OF CANADA.

PRICE SCALE.

Application filed August 14, 1922. Serial No. 581,801.

*To all whom it may concern:*

Be it known that I, JAMES D. McGREGOR, a subject of the King of Great Britain, residing at Brantford, in the Province of Ontario and Dominion of Canada, have invented certain new and useful Improvements in Price Scales; and I do hereby declare the following to be a full, clear, and exact description thereof, reference being had to the accompanying drawings, forming part of this specification.

This invention relates to improvements in price scales, more especially to that type of price scale commonly known as fan chart scales, wherein the chart is of segmental form and for co-operating with it there is a swinging indicator controlled by a pendulum weight, which latter also forms the counterbalance for the goods placed on the platform. The platform is located at a lower level than the chart and indicator but immediately above the base, which rests on a counter or other support, and in front of the upstanding housing in which the chart and pendulum weight are located.

In scales of this type it is desirable to form the base housing together with its contained lever and yoke mechanism as low and compact as possible, so as to reduce the height of the platform and to enable the chart to be brought down to the level or approximately the level of the eyes of the user, but it is obvious that with such an arrangement difficulties will be encountered in connection with the proper location and functioning of the check mechanism for the yoke and of the dashpot or vibration regulating mechanism, such as has to be employed in connection with all successful and accurate scales of this kind.

Among the objects of the present invention is the provision of a scale which will accomplish the ends above indicated and at the same time so simplify and arrange the operating parts that they may be entirely enclosed, leaving no opportunity for the merchant to so manipulate the exposed beams and parts that the customer may be cheated without being aware of the fact.

A further object of the invention is to provide a construction wherein the operating parts of the scale are built upon a base casting or foundation and are entirely independent of the enclosing housing, whereby two important advantages are attained. The first and most important advantage lies in the fact that, by this construction, the upstanding parts which support the pendulum, indicator and chart may be so designed and made of material which will not change its form through age or "curing," and being supported rigidly upon the base casting there is no danger of distortion after the scale is once calibrated and sealed. The second important advantage derived from this construction lies in the fact that, in the shipment or handling of the scale by grasping or engagement with the enclosing housing any distortion of the housing by reason of the forces applied to it in shipment or in handling are not transmitted to the bearings or working parts of the scale, and hence the latter will retain accuracy of position and operativity.

In carrying the invention into effect, certain changes in details of construction of the operating parts and in their relation and arrangement have been found necessary, and the invention, therefore, consists in such features and others which will be apparent from the following description.

Referring to the accompanying drawings,—

Fig. 2 is a top plan view of the same.

Fig. 3 is a vertical section through the base casting and housing and with the front of the upstanding housing removed to show the general form and arrangement of the tree and pendulum weight and indicator supported thereby.

Fig. 4 is a sectional elevation in a vertical plane at right angles to the plane of the section, Fig. 3.

Fig. 5 is a top plan view of the base casting scale lever and yoke, the check arm of the latter being shown in section and the platform support removed.

Fig. 6 is a sectional perspective view of the dashpot or vibration controller and regulator.

Fig. 7 is a detail view, partly in section, of the pendulum weight and eccentric for the strap connection with the scale lever.

Fig. 8 is a detail of the means for holding the platform on its support or spider.

Figure 1:
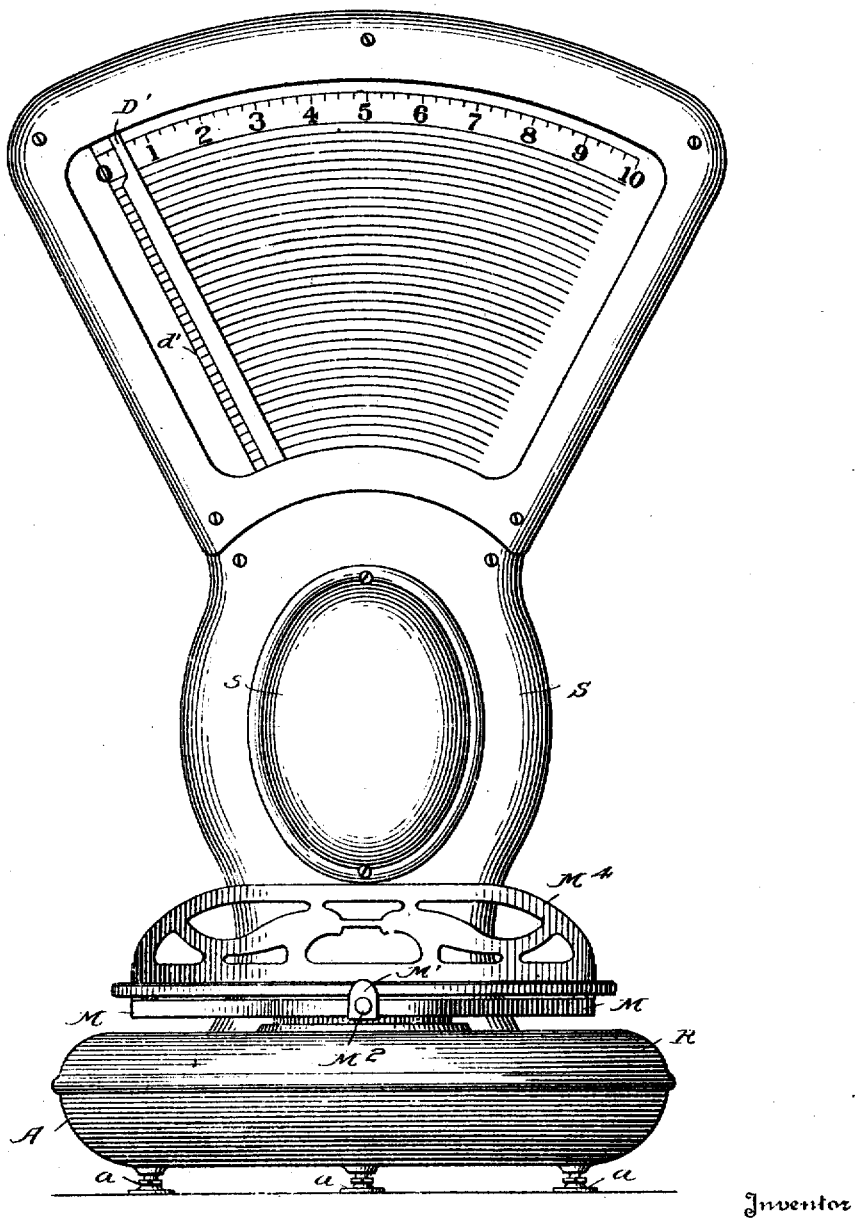
Figure 1 is a front elevation of the scale embodying the present invention.

With the object of making an effective enclosure extending beneath the scale levers and operating parts of the scale there is provided a base casting which is of dishlike form; that is to say, it is preferably concave on the upper side for the reception of the contained parts and convex on the under side, this base casting being indicated on the drawings by the reference letter A. In its preferred form it is provided with leveling supports $a$ on the under side, and within it there are integral upwardly extending supports A' for the bearings of the scale lever, A$^2$ for the upwardly extending tree on which the pendulum lever and indicator are mounted, and A$^3$ for the level indicator. All of these parts, together with the edge of the base casting, are finished in a single plane, thus permitting of a cheap mechanical operation by disk grinding and affording a uniform plane upon which the working parts and casing may be mounted. In addition to the upstanding parts within the base casting before referred to, it is provided with internal strengthening ribs and flanges as shown clearly in Fig 5, at A$^4$, and at the junction points of these flanges, or at other points, they are properly expanded to form screw receiving sockets, whereby the overlying parts may be properly secured in position.

The upstanding part B, which is rigidly mounted on the base, and heretofore termed a "tree," is of suitable flange and web construction to permit of its firm attachment to the base casting by means of three screws which enter the threaded sockets $b$ in the base casting, as shown in Fig. 5, and at its upper end it constitutes the support for the bearings of the knife edges or pivots carrying the pendulum weight C and pointer or indicator arm D. In addition it is provided with a segmental part B' to the top of which the lower edge of the fan-shaped chart frame E is attached by suitable screws or rivets, these parts forming the skeleton or framework, so to speak, for all of the working parts of the scale and they are entirely independent of the enclosing housing or casing, which latter are supported from the base casting as will presently appear, so as to enclose but be normally without any contact whatever with the aforesaid framework. The tree is preferably made of a higher grade metal which will not change shape or warp.

The working parts of the scale consist essentially of a scale lever F pivotally mounted on the supports A' and provided with a forwardly extending arm F' which, through the usual loose and flexible connectors G is connected with the eccentric $d$ of the pendulum weight and indicator. This scale lever F is open centrally for the accommodation of the dashpot connection with the yoke, to be presently described, and on the side of the pivots opposite the arm F' it is provided with an arc-shaped balancing end F$^2$, trough-like in section and adapted to be more or less filled with lead or counterbalancing weight material, and this material, in conjunction with the adjustable weight F$^3$ on a forwardly extending rod F$^4$ mounted on the lever, is adapted to initially balance the normal load placed upon the lever when the scale is in balance, the sealing by adjustment or subtraction and addition to the lever being in accordance with customary practice.

The yoke H is as usual pivotally supported on knife edges carried by the lever F forward of the lever pivots, and this yoke is provided centrally with a circular body portion H', from which there projects on one side a counterbalance weight H$^2$ similar in construction to weight F$^2$ of the scale lever, but preferably having the trough-like structure open toward the bottom, so that the lead or counterbalance material is placed therein, while the yoke is inverted. At the opposite side of the central circular portion H' of the yoke there projects a check arm H$^3$ of this instance, is integral with the yoke, and after extending to the rear end of the base casting it takes the form of an angle bracket or is provided with an integral upstanding portion at the upper end of which the check links are located. In the present construction the right angle check arm indicated generally by reference letter H$^3$ is provided with a wide web or flange H$^4$ at the right angle portion and, in order to give sufficient space for the accommodation of the greatly broadened form of the check arm at the angle, the body of the arm is curved downwardly and then upwardly, as best seen in Fig. 4, the result being a structure which is not only rigid against deflection fore and aft under strains, when the load is placed on either the front or back of the platform, but also a structure which is not liable to be distorted by temperature changes, or by seasoning of the material or metal of which the parts are formed. At its upper end, the check arm is connected with a fixed post I mounted in the upper end of the tree, through the medium of check link mechanism of such character that it will operate with equal accuracy regardless of whether or not the strain is a lateral push or a pull. This result is best attained by spacing the centers apart vertically, one center operating when the strain is a pull and the other center operating when the strain is a push, it being understood that strains in opposite directions are produced when goods to be weighed are placed on the front or back of the platform, thus introducing a pivotal movement with the knife edges of the yoke as a center, and which movement must be resisted by the check link mechanism. A single check link of ordinary construction is objectionable for the reason that it must operate around fixed centers and consequently, when the check arm is depressed by a load at the back of the platform and the link is under tension, the resistance to the swinging movement of the link about its center is different from the resistance when the load is at the front of the platform and the link is under compression. In other words, a movement of the link about its center when under compression, will either assist or oppose the gravity action of the load, and this effect of resistance or opposition will be reversed when the load is on the front of the platform, thus introducing a factor of error in the operation of the scale. In the present instance this is overcome in the simple way shown in Fig. 4, by the provision of two check links arranged slightly divergent to each other, and one designed to take compression strains while the other is designed to take tension strains, the centers of movement and centers of attachment to the check arm being such that one link operates under tension strains to either assist or oppose the gravity action and the other to similarly either assist or oppose gravity action under tension strains, the result being that regardless of where the load is placed on the platform, the same modifying influence is introduced in the operation of the scale and in any event such influence is reduced to a minimum and may be readily compensated for in the sealing of the scale. In the preferred construction tension strains in the link tend to rotate the link about its pivotal center in the direction in which the check arm is moving downwardly under the influence of gravity, and similarly compression strains in the link tend to rotate the link about its center in the direction in which the check arm is moving downwardly under the influence of gravity. As shown in Fig. 4, for example, the upper one of the two check links I' is designed to operate under tension, and therefore it is normally slightly inclined upwardly toward the check arm with the result that lateral tension strains tend to rotate it downwardly, and similarly the lower check link I² is designed to resist compression strains, and pressure in this direction tends to rotate it downwardly, owing to the fact that it is normally slightly inclined downwardly.

Figure 9:
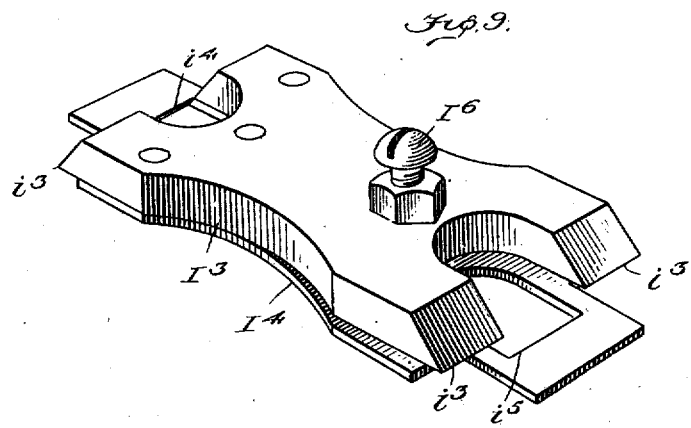
Fig. 9 is a perspective view of the preferred form of check link.
Figure 10:
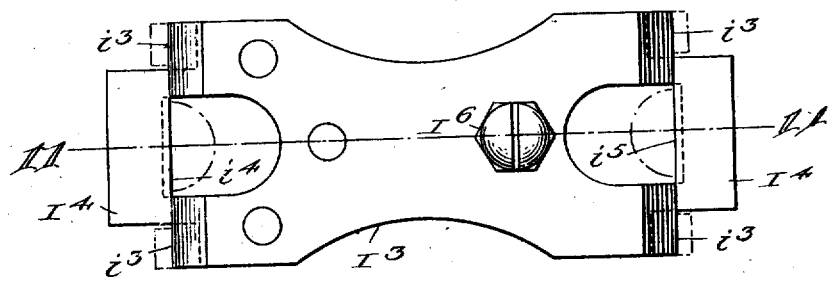
Fig. 10 is a top plan view of the same, showing the posts and plates with which it co-operates in dotted lines.
Figure 11:
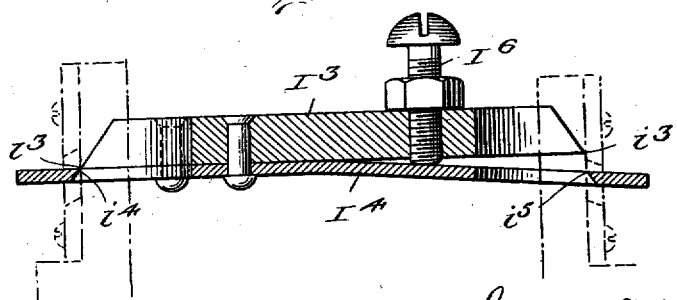
Fig. 11 is a vertical section through the check link substantially on the line 11—11 of Fig. 10.

Obviously, the same effect can be secured by a V-shaped check arm, so to speak; that is to say, a check arm which has a single pivotal point or axis at one end and two pivotal points or axes at the opposite end. Such an arrangement is illustrated in Figs. 9, 10 and 11, wherein it will be seen that the check arm is a built-up structure and the pivotal points are formed by knife edges. In this construction the body I³ of the check arm is provided with knife edges i³ at opposite ends and spaced from each other. To one side of this body I³ there is secured at one end a plate I⁴ which has openings cut in it to form knife edges i⁴, i⁵. A set screw I⁶ with suitable means to hold it in adjusted position is provided for separating the plate and body at one end. With this arrangement the knife edges i⁴, i⁵ co-operate with the flattened faces of the posts while the knife edges i³ co-operate with the opposite directed faces of small plates secured to the posts as indicated in dotted lines in Figs. 10 and 11. This arrangement of post and plate is a known arrangement for check devices wherein the knife edge bearings are employed, but in the present instance the knife edges i⁵, i³ at one end of the check link are spaced from each other and will co-operate with the plate and post above and below the horizontal or the level of the knife edges at the opposite ends of the link. If, therefore, the parts be arranged as shown in Fig. 11, where the fixed post is at the right hand side and the check arm at the left hand side, it will be readily seen that lateral pressure on the knife edges i³ would tend to rotate the link downwardly, and also lateral tension on the link exerted on the knife edges i⁴ and i⁵ would also tend to rotate the link downwardly; thus, in each instance lateral pressure on the upper end of the check arm which is at the left hand side of Fig. 11 would cause the link to operate with practically no variation in resistance due to the swinging of the link about its center.

The platform spider is preferably provided with three arms M, thus affording a three-point support for the platform, which latter is preferably circular and made of glass, as indicated in the drawings. In applying the platform to its spider or support, its beveled rear edge is caught under the projections or is carried by the two rearwardly extending arms M while its front edge is held by a clamp M' best seen in Fig. 8 of the drawing, said clamp co-operating with the beveled edge of the platform and being drawn down and inwardly through the co-operation of the adjusting screw M² and the inclined face M³ on the spider arm. With this construction there is no projection above the surface of the platform save at the rear end where a circular guard M⁴ is provided which is not only ornamental but serves the useful function of preventing goods from being pushed too far to the rear or into contact with the upright part of the scale.

The central portion of the spider M is cut away to form an opening corresponding to the circular opening in the yoke, this opening being preferably rabbeted for the reception of a cover plate N which serves to conceal the screws uniting the spider and yoke and also as a convenient means for the attachment of the stem of the plunger of the dashpot, and as a dial for the vibration regulator.

Immediately below this opening is the opening in the base casting, and the dashpot O is mounted preferably by being inserted from the lower side through the opening and having its base flange O' fastened to the base casting by suitable screws or otherwise. This location of the dashpot is immediately below the center of the platform spider and the stem of the plunger or piston $O^2$ in the dashpot extends up through a sleeve in a screw cover $O^3$, and at its upper end is passed through an opening in the aforesaid plate N. A cross pin $n$ passes transversely through the end of the stem and, being covered by a bearing plate N', serves to complete the loose pivotal attachment of the piston to the platform spider or yoke.

For the purpose of regulating the resistance to the transfer of the oil or liquid in the dashpot from one side of the piston to the other, the stem is provided with a central opening at the bottom which merges into transverse openings $O^4$ above the piston, and surrounding the stem is a sleeve $O^5$ having corresponding transverse openings therein. By the rotation of the sleeve with relation to the piston stem or rod, the size of the openings or passages may be regulated so as to control the action of the dashpot. The upper end of the sleeve is provided with an arm $O^6$, the end of which projects through a segmental slot in the plate N and serves as a means whereby the action of the dashpot may be regulated so as to compensate for the variation in fluidity of the oil under changes in temperature.

As a convenience of construction the sleeve $O^5$ is at its upper end provided with a tapered screw-threaded enlargement which will screw tightly into the sleeve on the cover $O^3$ of the dashpot when the parts are permitted to come together, and in shipping the scale it is customary to detach the piston rod from the platform spider or yoke and allow it to drop down to a level where the plug may be screwed into the top of the dashpot so as to prevent any possible escape of oil therefrom and without the use of a packing washer. The sleeve on the cover $O^3$ projects down into the dashpot a sufficient distance to form a chamber to accommodate the oil above the plunger should the scale be inverted during shipment, thus increasing the safeguard against leakage.

The movements of the working parts of the scale are limited to movements which are sufficient only to carry the indicator throughout the desired range, and it is one of the objects of the present invention to provide means whereby these movements may be limited by stops which are so positioned to reduce any possible injury to either the working parts of the scale or to the casing. Thus, there is located in the bottom casting of the scale an adjustable lever stop P against which the lever will strike when the lever moves so as to carry the indicator to approximately two ounces over the capacity. This stop may well be in the form of a screw threaded pin $P^3$ adjustable in a screw threaded socket formed on the base casting A. The indicator or pivoted arm, including the pendulum weight, which parts are of some weight, and therefore have some inertia, are stopped in their movement by fixed stops which are mounted directly on the tree B, these stops being so located that they contact with integral parts of the structure which forms the counterbalance weight. The lower stop P' (Fig. 3) is in position to contact directly with the body of the pendulum weight C, while the upper stop $P^2$ is in position to contact with an integral upwardly extending arm on the weight C. Thus, the adjustable weight C' on the pendulum is not liable to be thrown out of adjustment by contact with a limiting stop, as is found to be the case in many scales at present on the market.

The upward extension of the indicator arm D is preferably bent over the top of the chart and extends down in a parallel reach on the further side, while the actual indicating element is a wire $d'$ fastened to the extreme end of the arm D' and after passing through openings in the bent portion of the same at the edge of the chart is drawn taut by a spring $d^2$ secured to a projection on or near the base of the arm. This arrangement forms an accurate straight line indicator and one spring serves to hold the same taut on both sides of the chart.

With the working parts of the scale as hereinbefore described all assembled on the base casting A, it will be seen that the whole may be enclosed in a housing or casing which need not interfere with or affect the operation of the same. This housing or casing is conveniently formed of three parts, with the necessary glass windows in two of the parts. There is thus a bottom cover or housing R which is readily located in position on the edge of the base casting, this usually being done before the platform spider is secured in place, which housing R is conveniently held in by four screws $r$, (Fig. 2) which enter corresponding threaded sockets in the base casting as indicated in Fig. 5. The upright portions of the working parts of the scale are enclosed by front and rear housings S and S' which are fastened together by marginal screws and to the base casting by screws which may be inserted from the under side of the base casting, so as to avoid any break in the smooth contour lines of the enclosure.

As a convenient means for giving access to the pendulum and parts associated therewith, the front and rear casings S and S' may be provided with oval openings covered by plates s, s', and if desired the centers of the plates s, s' may constitute surfaces against which rubber pads or buffers $s^3$ may contact, should unusual lateral deflection of the casing occur. These rubber buffers $s^3$ are mounted on the tree B, but normally are intended to lie just out of contact with the cover plates.

For convenience in leveling the scale, adjustable feet are provided and to determine when it is level there is preferably provided a dial or circular spirit level T mounted on the top of the level support $A^3$ which forms an integral part of the base casting. By mounting this level on the base casting it is obvious that the greatest certainty of properly positioning the scale is secured, inasmuch as this base casting is the foundation upon which all of the working parts are mounted, and in relation to which the scale is originally calibrated and sealed. The accurate application of the casing or the distortion or warping of the same therefore becomes of little moment and save for appearances may be ignored, without in any wise affecting the operativeness or accuracy of the scale mechanism or of the means for properly leveling and positioning the mechanism.

In shipping scales of this type it is quite important that the knife edges should not be allowed to rest on their bearings during shipment, and in order to make provision for permitting of parts being held out of engagement, such as will not require the merchant receiving the scale to take the same apart, I have provided the platform lever with two screw sockets V (Fig. 5) for the reception of screws V' (Fig. 2), which screws will draw the platform lever up and hold it firmly away from its bearings. In addition, the yoke is provided with a screw socket $V^2$ with which a screw $V^3$ (Fig. 2) co-operates for drawing the yoke up away from its bearings. By the simple removal of these three screws the lever and yoke are permitted to drop down to their bearings and the scale is ready for use.

What is claimed is:

1. In a price scale of the fan chart type, a dish-like base casting having supporting projections on the under side and inside upwardly projecting lever bearings, and tree support integral therewith, in combination with an upwardly projecting tree mounted rigidly on the tree support and carrying at its upper end the chart and bearings for the pendulum and check and an enclosing housing mounted on the base casting and enclosing but independent of the said upwardly extending supports for the operating parts of the scale.

2. In a price scale of the fan chart type, a dish-like base casting having inside upwardly projecting lever bearing supports, and an upwardly projecting tree support, the edge of the casting and the top of said supports being finished in a single plane, of a tree for carrying the chart and pendulum indicator bearings mounted rigidly on the tree support, and an enclosing housing mounted on and positioned by the edge of the base casting and enclosing but independent of the tree and supports for the working parts of the scale.

3. In a price scale of the fan chart type, a dish-like base casting having integral lever bearing supports, a tree support, and a lever support projecting upwardly from its inner side, said supports and the edge of the base casting being finished in a single plane.

4. In a price scale, a base casting carrying the supports for the lever pivots, a lever pivotally mounted in said supports, a yoke pivotally mounted on the lever and a platform mounted on the yoke, in combination with a dashpot mounted on the base casting at a point centrally between the yoke pivots, and a plunger in the dashpot connected with the yoke at substantially the center of the platform.

5. In a price scale, a base casting having a central dashpot opening therein and lever pivot supports laterally disposed with relation to said opening, a lever mounted in the supports, a yoke pivotally mounted on the lever, and a platform carried by the yoke, of a dashpot removably mounted in the opening in the base casting, and a plunger in the dashpot pivotally connected with the yoke, said dashpot being located centrally between the yoke pivots, and below substantially the center of the platform.

6. In a price scale of the fan chart type, the combination of the base having lever bearings thereon, a lever pivotally mounted in said bearings, a yoke pivotally mounted on the lever, a housing forming a covering for said base, lever and yoke, and co-operating lifting elements in said housing, lever and yoke for elevating said lever and yoke off their respective bearings.

7. In a price scale of the fan chart type, the combination of a base having lever bearings therein, a lever pivoted in said bearings, a yoke pivotally mounted on said lever, said yoke and lever each having screw-threaded sockets therein, a covering for said base, yoke and lever and screws carried in said covering adapted to co-operate with the sockets in the yoke and lever for raising said yoke and lever off of their respective bearings.

8. In a price scale, the combination with a base casting, a lever pivoted on the base, a yoke pivoted on said lever, a covering secured to the casing for enclosing said parts, and a platform carried by the yoke, of vibration regulating mechanism consisting of a dashpot, a cover for the dashpot, a sleeve extending through the cover, a plunger in the dashpot, a plunger stem extending up through the sleeve and spaced therefrom, a tapered screw plug carried by the stem for closing the space between said stem and sleeve and means accessible above the casing covering for regulating the flow of fluid in the dashpot.

9. In a price scale, the combination with the base, a lever pivotally mounted on the base, a yoke pivoted on the lever and a platform carried by said yoke, of vibration regulating mechanism comprising a dashpot, a dashpot cover, a sleeve extending up through the cover, a plunger in said dashpot, a plunger stem extending up through the sleeve and detachably connected to said yoke, said stem being spaced from said sleeve, and a tapered screw plug carried on said stem for closing the opening between the stem and sleeve when said stem is detached from the yoke.

10. In a price scale, the combination with a scale housing, of a vibration regulating device comprising a dashpot, a dashpot cover, a plunger, a plunger stem, there being fluid passages in said stem opening on opposite sides of the plunger, and a sleeve surrounding said stem and accessible from the exterior of the scale housing for regulating the flow of fluid through the passages in the stem.

11. In a price scale, the combination of the scale housing, a dashpot, a dashpot cover, a plunger, a plunger stem having fluid passages therein opening on opposite sides of the plunger, and a sleeve surrounding and rotatable on said stem and provided with means for varying the size of said fluid passage openings on one side of the plunger, said sleeve being accessible from the exterior of the scale housing whereby the flow of fluid in the dashpot may be controlled from the exterior of the scale.

12. In a price scale, the combination of the scale housing, a dashpot, a dashpot cover, a plunger, a plunger stem having fluid passages therein opening on opposite sides of the plunger, and a sleeve surrounding and rotatable on said stem, said sleeve having a plurality of apertures therein adapted to register with the fluid passage openings in the stem whereby the flow of fluid through said passages can be varied at will and means on the exterior of the scale housing for rotating the sleeve on said stem.

13. In a price scale, the combination of the scale housing, a dashpot, a dashpot cover, concentrically arranged spaced sleeves extending upwardly through said cover, means carried on one of said sleeves for closing the opening between the two sleeves, a plunger, a plunger stem having fluid passages therein opening on opposite sides of the plunger, and means on one of said sleeves for varying the size of said fluid passage openings said last mentioned means being accessible from the exterior of the scale housing.

14. In a scale of the fan chart type, the combination with a base casting carrying the lever and yoke, of an upwardly extending tree mounted rigidly on the base casting, a chart mounted on the upper end of the tree, pendulum and indicator mechanism movably supported on the tree, and a casing mounted on the base casting and surrounding but independent of the tree and parts carried thereby.

15. In a scale of the fan chart type, the combination of a base casting carrying the lever and yoke, an upwardly extending tree mounted rigidly on the base casting, a chart, a pendulum weight and indicator on the tree, stops on the tree for limiting the movement of the pendulum weight and indicator in both directions, and a casing on the base casting enclosing the tree and parts carried thereby, said casing being entirely supported by the base casting and independent of said tree and the parts carried by said tree.

16. In a scale of the fan chart type, the combination of the base casting, upwardly projecting tree rigidly mounted thereon, lever pivotally mounted on the base casting, yoke pivotally mounted on the lever and having an integral upwardly extending arm substantially parallel with the tree, a check link connecting the upper ends of the arm and trees and a casing enclosing said tree and arm, said casing being independent of said tree, arm and check link whereby the operativeness of said parts is unaffected by distortion of said casing.

17. In a scale of the fan chart type, a yoke formed of a single integral casting having a base portion open at the center and with laterally arranged bearings and an upwardly extending check arm at substantially right angles to the base, said arm at its angular portion being provided with webs or flanges to resist lateral deflection.

18. In a scale of the type specified, a lever and yoke and a platform support or spider carried by the yoke and provided with three substantially equally spaced platform supporting and engaging parts rigidly connected together, whereby a single plane support for the platform is formed.

19. In a scale of the type specified, a lever, a yoke and a transparent platform mounted on the yoke, in combination with a dashpot connected with the yoke beneath the platform and a regulating arm for the dashpot located beneath but in position to be observed through the platform.

JAMES D. McGREGOR.